(12) United States Patent
Wech

(10) Patent No.: US 9,557,206 B2
(45) Date of Patent: Jan. 31, 2017

(54) ADJUSTABLE FLUID LEVEL VERIFICATION APPARATUS

(71) Applicant: OIL-RITE CORPORATION, Manitowoc, WI (US)

(72) Inventor: Michael J. Wech, Manitowoc, WI (US)

(73) Assignee: Oil-Rite Corporation, Manitowoc, WI (US)

(*) Notice: Subject to any disclaimer, the term of this patent is extended or adjusted under 35 U.S.C. 154(b) by 546 days.

(21) Appl. No.: 14/064,822

(22) Filed: Oct. 28, 2013

(65) Prior Publication Data
US 2015/0114109 A1    Apr. 30, 2015

(51) Int. Cl.
*G01F 23/02*    (2006.01)
*G01F 23/00*    (2006.01)

(52) U.S. Cl.
CPC ........... *G01F 23/02* (2013.01); *G01F 23/0046* (2013.01)

(58) Field of Classification Search
CPC .............................. G01F 23/0046; G01F 23/02
USPC .......................................................... 73/323
See application file for complete search history.

(56) References Cited

U.S. PATENT DOCUMENTS

| | | | |
|---|---|---|---|
| 21,836 A | 10/1858 | Johnson et al. | |
| 480,736 A | 8/1892 | McGrory | |
| 680,993 A | 8/1901 | Flinn | |
| 707,943 A | 8/1902 | Rockwell | |
| 986,199 A | 3/1911 | Moser | |
| 1,164,484 A | 12/1915 | Ernst | |
| 1,406,926 A | 2/1922 | Bryan | |
| 1,508,272 A | 9/1924 | Cuff | |
| 1,989,167 A * | 1/1935 | Dohrmann | G01F 19/00 73/323 |
| 2,160,754 A * | 5/1939 | Ross | G01F 23/02 73/323 |
| 2,584,446 A | 2/1952 | Hastings et al. | |
| 2,607,226 A | 8/1952 | Biscoe | |
| 2,842,089 A * | 7/1958 | Midkiff | G01F 23/02 116/276 |
| 3,150,524 A | 9/1964 | Arens | |
| 3,154,945 A | 11/1964 | Busillo | |
| 3,212,334 A | 10/1965 | Conlon | |
| 3,219,071 A * | 11/1965 | Ferster | F16K 37/0058 141/319 |
| 3,292,434 A | 12/1966 | McDaniel | |
| 3,390,463 A | 7/1968 | Hirsch | |
| 3,455,163 A | 7/1969 | Lukas et al. | |
| 3,540,276 A | 11/1970 | Lyden | |

(Continued)

FOREIGN PATENT DOCUMENTS

GB       1133798      11/1968
WO    WO84/04163    10/1984

*Primary Examiner* — Hezron E Williams
*Assistant Examiner* — Marrit Eyassu
(74) *Attorney, Agent, or Firm* — Ryan Kromholz & Manion, S.C.

(57) ABSTRACT

An improved fluid level verification apparatus which may be manufactured or otherwise fabricated as a kit and assembled at a remote location for use on liquid filled containers and configured to reduce inherent mechanical stresses on the inspection tube and resists leakage due to environmental, chemical, thermal or mechanical expansion cycles by using internal grooves and entrapped o-rings. The improved fluid level verification apparatus having at least one adjustable end to provide adjustable spacing between the fluid level verification apparatus inlet and outlet.

7 Claims, 6 Drawing Sheets

(56) References Cited

U.S. PATENT DOCUMENTS

| | | | |
|---|---|---|---|
| 3,596,939 A | | 8/1971 | Gibson |
| 3,835,708 A | | 9/1974 | Gruett |
| 3,886,796 A | | 6/1975 | Gruett |
| 4,050,305 A | | 9/1977 | Evans et al. |
| 4,154,103 A | * | 5/1979 | Fling ........................ G01F 23/30 73/305 |
| 4,345,468 A | | 8/1982 | Jackson |
| 4,821,587 A | | 4/1989 | Rogers |
| 5,052,224 A | | 10/1991 | Ford et al. |
| 5,323,653 A | | 6/1994 | Gruett |
| 5,379,913 A | | 1/1995 | Rieke et al. |
| 6,532,815 B2 | | 3/2003 | Wech |
| 6,758,092 B2 | | 7/2004 | Wech et al. |
| 6,857,315 B1 | | 2/2005 | Mills et al. |
| 6,928,716 B2 | | 8/2005 | Wech et al. |
| 7,314,237 B2 | | 1/2008 | Warden |
| 7,574,912 B2 | | 8/2009 | Fling et al. |
| 2007/0234798 A1 | | 10/2007 | Fling et al. |

* cited by examiner

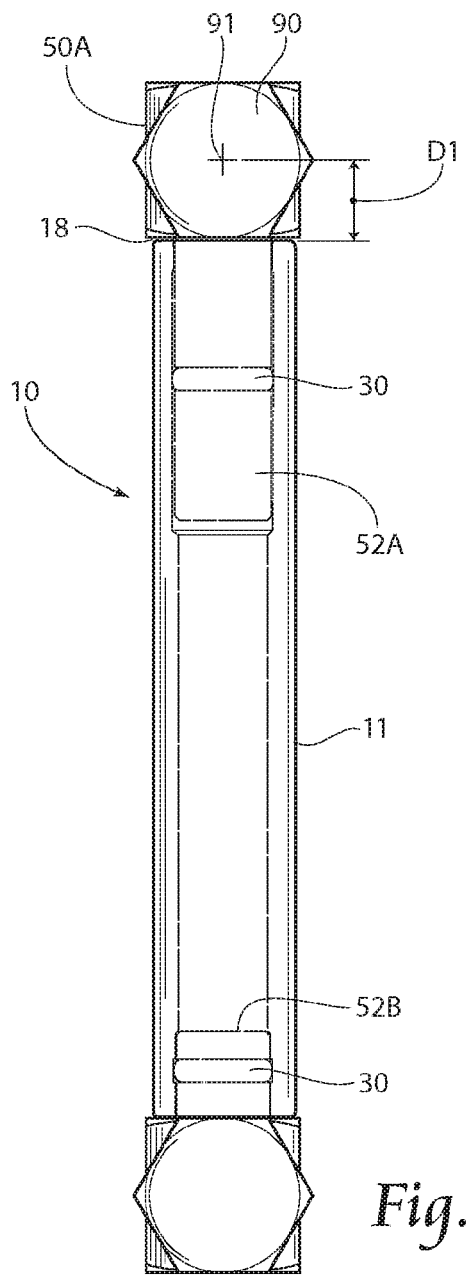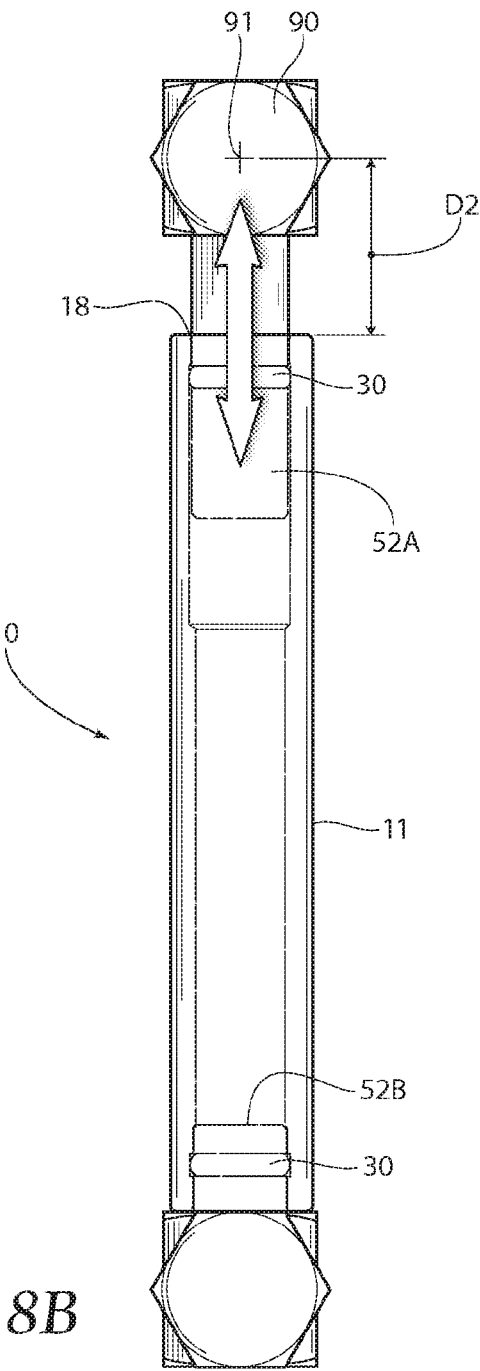
Fig. 8A
Fig. 8B

ADJUSTABLE FLUID LEVEL VERIFICATION APPARATUS

BACKGROUND OF THE INVENTION

1. Field of the Invention

The present invention relates generally to a fluid level verification apparatus which is operable to measure the amount of fluid present in an object of interest, such as a tank, machine, or other article of manufacture, and more specifically, to an apparatus which may be manufactured or otherwise fabricated as a kit and assembled at a remote location for use on particular machines or in manufacturing processes; and which minimizes the number of components required; and further to a fluid level verification apparatus which reduces mechanical, thermal and chemical stresses on the apparatus.

2. Description of the Prior Art

The prior art is sated with examples of fluid level verification apparatuses which provide a means for visually verifying or otherwise discovering the fluid levels in an object of interest, such as manufacturing machinery, fluid holding tanks, or other similar assemblies. For example, in certain industrial processes or in certain machines or other articles of manufacture, it is important that particular fluids, such as lubricants, coolants, hydraulic fluids, or other fluid components, be stored in tanks and periodically dispensed from such tanks. Prior art fluid verification devices have typically included a transparent tube or inspection window, which is connected in particular relation to the holding tank, and which provides a quick and convenient means by which an observer may visually verify the level of the fluid present.

While the prior art devices have operated with success, they have been unsatisfactory in several respects.

Gruett U.S. Pat. No. 5,323,653 provides a detailed background of the prior art and describes a fluid level verification apparatus that can be fabricated as a kit and assembled at a remote location. Gruett contemplates an inspection tube having an interior conduit dimensioned to create an interference fit with an o-ring used to hermetically seal the inspection tube to an end member. The Gruett apparatus requires a separate seal on the outer diameter of its glass inspection tube to complete a hermetic seal.

Jackson U.S. Pat. No. 4,345,468 describes a double tube liquid site monitor which incorporates grooving and o-rings to isolate the inspection tube from the environment. However, the Jackson invention is complex and cumbersome, as it requires numerous parts to protect the inspection tube from the stresses caused by the environment. Moreover, the sealing function of the grooves are limited to the insert ends thus requiring the o-rings to rest against the internal and external surfaces of inspection tubes that have no such grooves and the problem of mechanical stress induced by the assembly of the inspection tubes to mating components is not contemplated.

Evans U.S. Pat. No. 4,050,305 describes an external shield bracket for a fluid flowmeter. The fluid of interest flows through a precision glass tube. An operator is protected from accidental explosion of the inspection tube due to fluid pressure by a protective transparent cover mounted on a u-shaped channel bracket. The Evans invention uses many parts, but fails to protect the inspection tube from the environment. Said transparent cover and mounting bracket do not form a hermetic closure for the inspection tube contained therein.

Gruett U.S. Pat. No. 3,886,796 describes a liquid level gauge with a rigid transparent plastic inspection tube with o-rings seated in grooves located in the end members. The Gruett invention induces mechanical stress on the inspection tube because Gruett did not contemplate o-ring grooves on the exterior or interior portions of the inspection tube. Further, because the ends of the inspection tube are restricted and nested in end members, stresses related to thermal, environmental and chemical expansion cycles are exasperated.

Lyden U.S. Pat. No. 3,540,276 describes a fluid level gauge. The Lyden invention uses an o-ring seal nested in an end member, communicating with the adjacent end of a site tube. Fluid leaks are minimized by placing the glass site tube in compression with the o-ring seal nested in the respective end member. The glass site tube is required because the Lyden invention requires compressive force on the tube. Thus, the design creates inherent mechanical stress and without utilizing the glass site tube adopts poorly to thermal, environmental and chemical expansion cycles and therefore would be susceptible to leakage.

Wech U.S. Pat. No. 6,532,815 describes a fluid level gauge. The Wech invention discloses a groove in an inspection tube and a groove in the nipple of a block in which an o-ring is placed. The design provides for ease of assembly and reduces the effects of inherent environmental stress on the apparatus. However, when installing the device, the mounting positions must be exact otherwise the o-ring will not sit properly in the two grooves. This makes installation more complicated and reliant on perfect placement. Incorrect installation would not only negatively impact the functionality of the device, but could also severely damage the tank on which it is to be installed.

In addition to the foregoing, many of the prior art devices are cumbersome and otherwise complex in their overall design, thereby increasing the cost to manufacture, decreasing the reliability and making them difficult to maintain. Further, the prior art is replete with designs that inadequately address the often conflicting requirements of resisting fluid leaks and protecting the inspection tube from mechanical, environmental, thermal and chemical stresses.

SUMMARY OF THE INVENTION

Therefore, it is an object of the present invention to provide an improved fluid level verification apparatus.

Another object of the present invention is to provide a fluid level verification apparatus which can be fabricated as a kit and remain assembled through subsequent handling, transport, and shipping operations.

Another object of the present invention is to provide a fluid level verification apparatus which can be manufactured to provide convenient means to efficiently assemble the apparatus at a remote location for use with a wide range of devices and other objects of interest without waste of effort, time or motion expended on re-assembly of the apparatus. Specifically, an object of the present invention is to prevent inadvertent dislodging of particular components comprising the invention, such as the bolts in relation to the blocks.

Another object of the present invention is to protect the transparent inspection tube from mechanical stress during manufacture, transport, handling, shipping, assembly, and use to a wide range of devices and other objects of interest.

Another object of the present invention is to provide a means to reduce or eliminate stress on the apparatus, whether such stress is due to thermal, mechanical, environmental or chemical agents acting upon the apparatus.

Another object of the present invention is to provide a means to reduce or eliminate leaking of the fluid flowing through the apparatus.

Another object of the present invention is to provide for adjustment of the device to increase the ease of installation.

DESCRIPTION OF THE DRAWINGS

FIG. 8A is a side view of the present invention in an adjusted compact position.

FIG. 8B is a side view of the present invention in an adjusted extended position.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
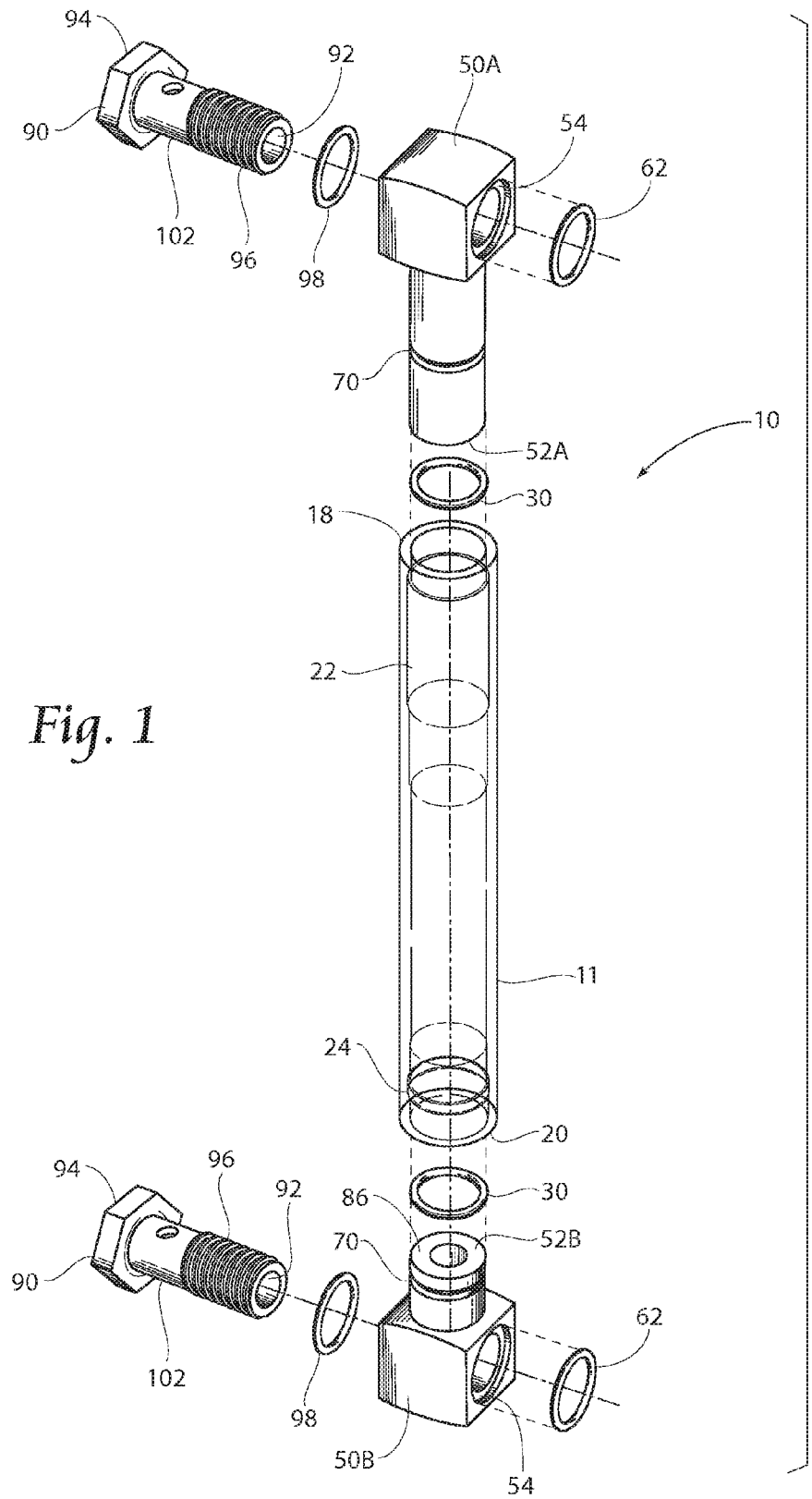
FIG. 1 is an exploded isometric view of the present invention.

Referring to FIG. 1, an improved fluid level verification apparatus 10 of the present invention is shown. The apparatus 10 has a clear inspection tube 11 having a first end 18 and a second end 20. Also depicted is a pair of end members or supporting blocks 50A and 50B, each block 50A and 50B having six sides and a pair of mounting bolts 90. Blocks 50A and 50B are depicted as having a long nipple 52A and a short nipple 52B, respectively. Each block 50A and 50B is removably secured to the inspection tube 11 at the first end 18 and second end 20, respectively. In turn, each bolt 90 is seated in a respective block 50A or 50B. It should be understood that the current invention is not limited to having one of each block 50A and 50B or to specific ends of the clear inspection tube 18 and 20 as depicted herein. It is contemplated that there may be two blocks having long nipples. It is also contemplated that the long nipple block 50A and the short nipple block 50B may be located on either end 18 or 20 of the clear inspection tube 11 opposite one another.

Figure 2:
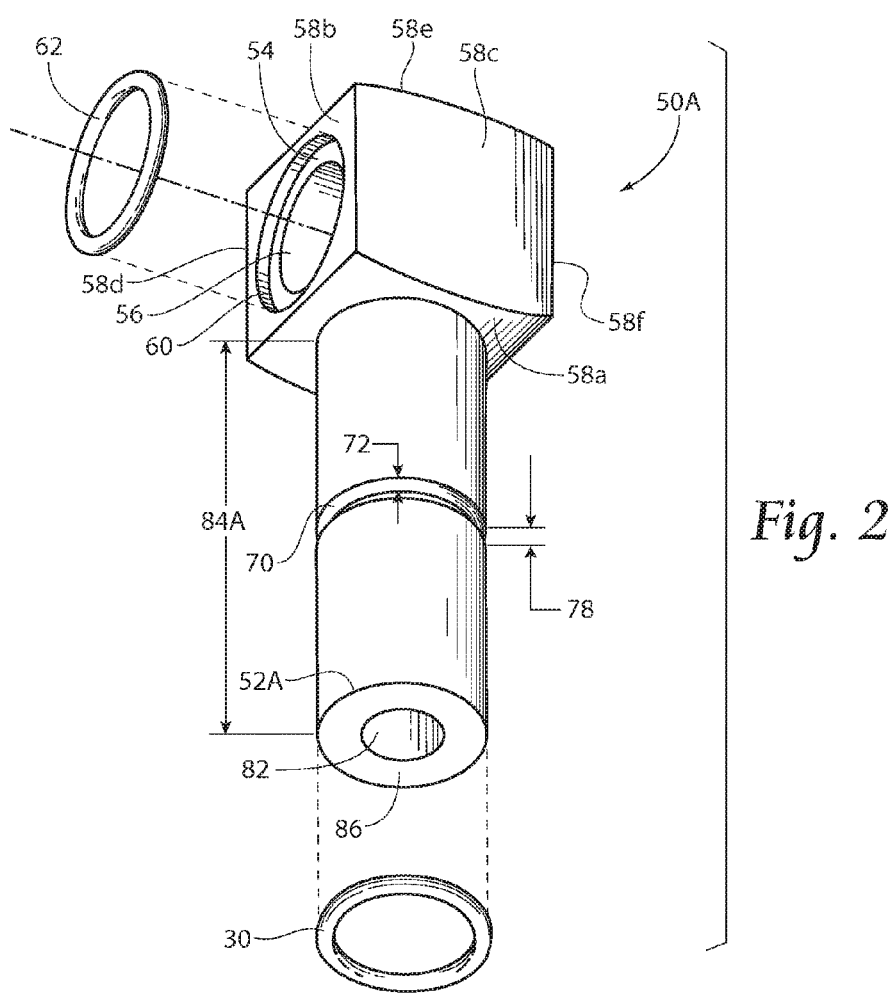
FIG. 2 is a detailed, exploded isometric view of a supporting block with a long nipple of the present invention.

Referring specifically to FIG. 2, the block 50A preferably comprises a plurality of faces 58a 58b 58c 58d 58e 58f and has a cylindrical projection or nipple 52A, protruding at a generally perpendicular offset from a face 58a of the block 50A. The nipple 52A has an aperture 82, which extends through the nipple 52A from the tip 86 to intersect a bore 56 of the block 50A, and is oriented generally parallel with the axis of the nipple 52A. The nipple 52A is of a predetermined nipple length 84A and has a concentric channel 70 with a predetermined channel depth 72 and channel height 78.

Figure 3:
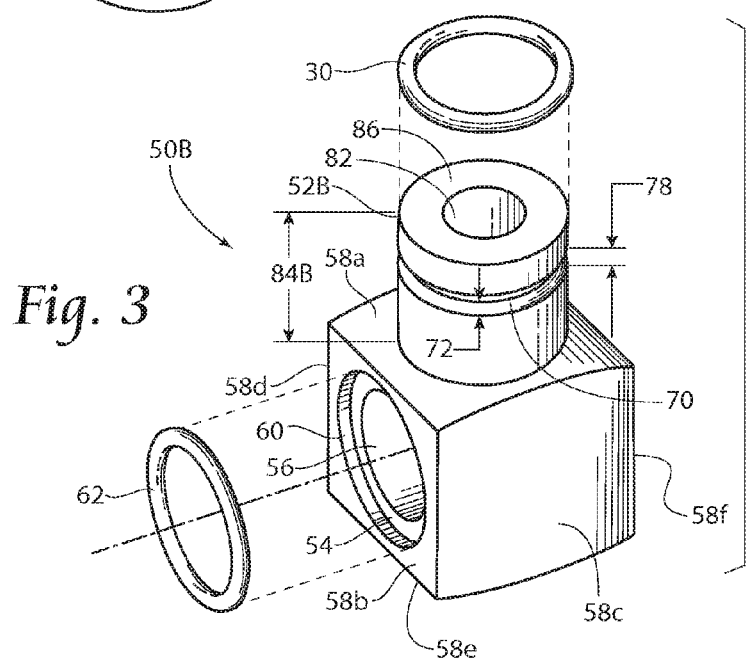
FIG. 3 is a detailed, exploded isometric view of a supporting block with a short nipple of the present invention.

Referring specifically to FIG. 3, the block 50B also preferably comprises a plurality of faces 58a 58b 58c 58d 58e 58f and has a cylindrical projection or nipple 52B, protruding at a generally perpendicular offset from a face 58a of the block 50B. The nipple 52B has an aperture 82, which extends through the nipple 52B from the tip 86 to intersect a bore 56 of the block 50B, and is oriented generally parallel with the axis of the nipple 52B. The nipple 52B is of a predetermined nipple length 84B and has a concentric channel 70 with a predetermined channel depth 72 and channel height 78.

Still referring to FIGS. 1-3, a tube seal 30 is depicted. The tube seal 30 fits on the nipple 52A, 52B and is seated in the channel 70. In a preferred embodiment, the tube seal 30, as well as other seals hereinafter described, may comprise an o-ring made from deformable synthetic material, such as nitrile, fluorocarbon, EPDM, and other similar materials.

Figure 6:
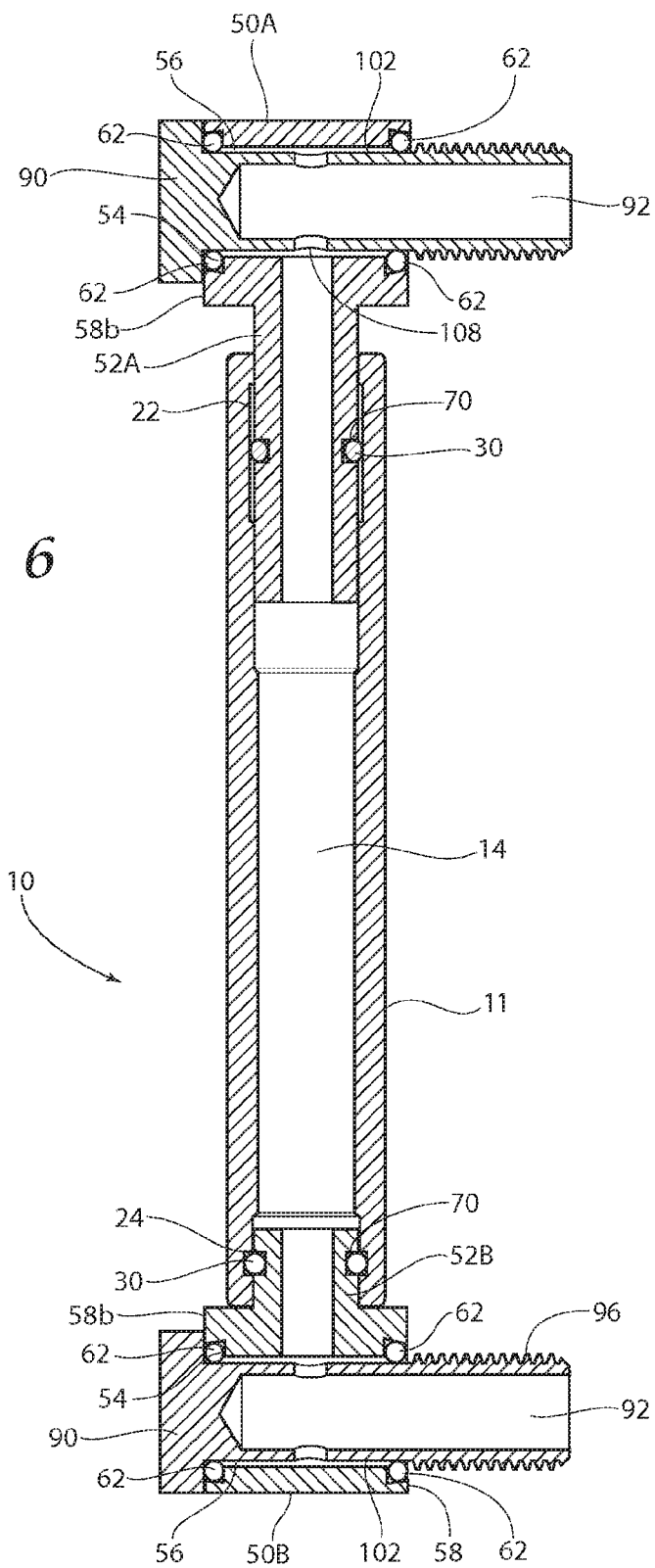
FIG. 6 is a cross-sectional view of the present invention.
Figure 7:
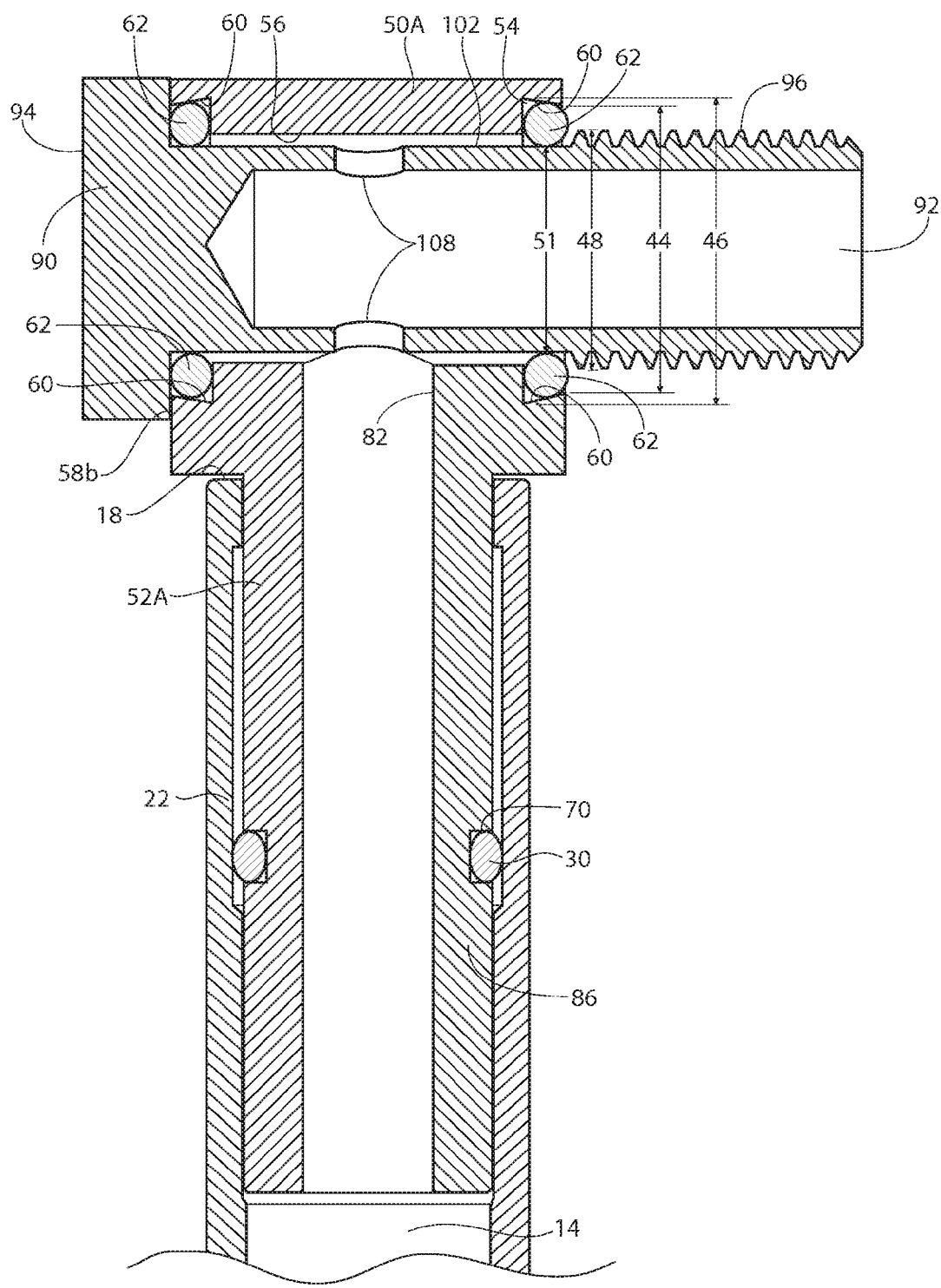
FIG. 7 is an enlarged fragmentary, cross-sectional view of a long nipple cooperating block, bolt and inspection tube of the present invention.

Referring now to FIGS. 1, 2, 3, 6 and 7, the faces 58b and 58f of blocks 50A and 50B have a depressed annular groove 54, which locates a concentrically located recessed inwardly tapered bevel 60 and communicates with the coaxial bore 56. As previously stated, the annular groove 54, the bevel 60, and the bore 56 are located on and between the faces 58b and 58f that are adjacent and generally perpendicular to the nipple 52A, 52B. The bore 56 projects through the entire block 50A, 50B and intersects the aperture 82 of the nipple 52A, 52B. A pair of seals 62 are positioned in each block 50A, 50B at the depressed annular grooves 54, creating a hermetic closure between each seal 62, the recessed bevels 60, the bore 56 and a bolt 90. Again, in the preferred embodiment, the seal 62 may comprise an o-ring or similar structure formed from a deformable material. When assembled, as shown in FIGS. 6 and 7, the bolt 90 is placed through the inboard seal 62 and block 50A, 50B; the final outboard seal 62 creates an interference fit with a bolt thread 96 and a bolt shaft 102.

Figure 4:
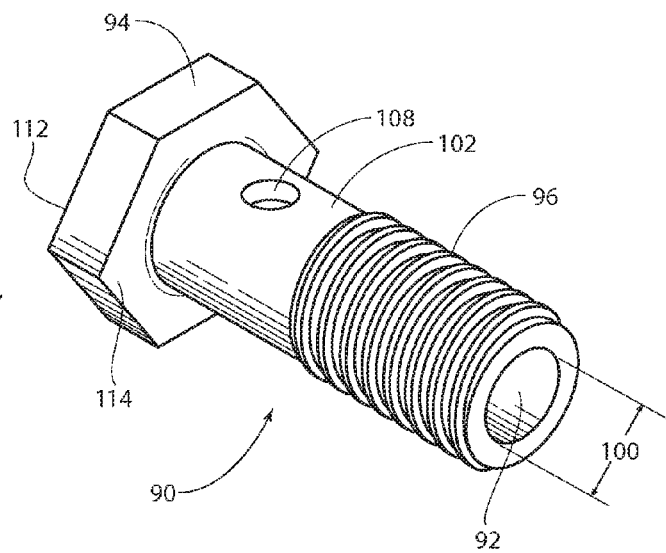
FIG. 4 a detailed, exploded isometric view of a bolt used in the present invention.

With reference to FIG. 4 in particular, the bolt 90 comprises a head 94, a bolt shaft 102, a thread 96 and a cylinder 92 with an inner diameter 100. Interposed on the bolt shaft 102 at a right angle are intersecting bolt holes 108. The shaft 102 terminates at a bolt head 94. The bolt head 94 has a bolt face 112 and an underside 114. The diameter of each of the bores 56 of the respective blocks 50A and 50B is larger than the inner unthreaded portion of the bolts 90 to provide sufficient spacing for free flow of fluid through the hollow bore 92 of the bolt 90, the bolt holes 108, the bore 56, the aperture 82 of the nipple 52A, 52B and the conduit 14.

Figure 5:
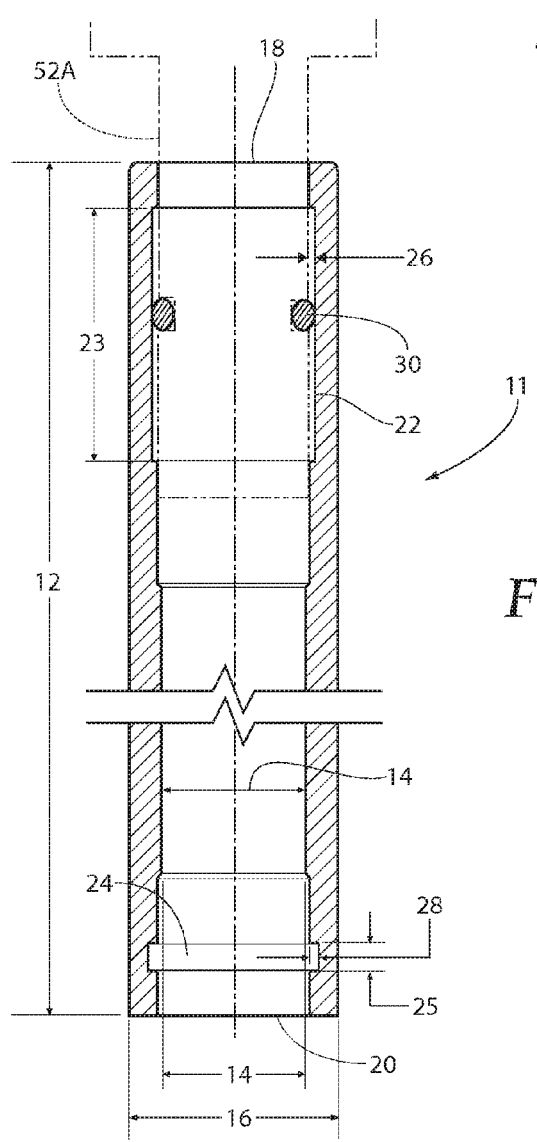
FIG. 5 is a vertical cross sectional view of the inspection tube of the present invention.

Now referring to FIG. 5, a vertical cross section of the inspection tube 11 is shown in detail. The tube 11 comprises the first end 18, the second end 20, a tube length 12, a conduit 14, and an outer diameter 16. A first groove 22 is positioned at a predetermined distance from the tube end 18 having a predetermined groove height 23 and groove depth 26. The groove depth 26 is selected to accommodate sealing gasket 30. Furthermore, a second groove 24 is positioned at a predetermined distance from tube end 20 having a respective groove height 25 and groove depth 28.

The tube 11 may be manufactured from various substrates such as nylon, polycarbonate, or other synthetic materials. While shown to be cylindrical in shape, it is conceivable that other conduit cross-sectional configurations could be utilized.

Looking now to FIGS. 6 and 7, the inspection tube 11 is removably secured to nipples 52A and 52B by means of the tube seal 30 that fits on nipples 52A and 52B at the channel 70. The tube seal 30 positioned in channel 70 of nipple 52B simultaneously lodges in groove 24 of the inspection tube 11.

Continuing to look at FIGS. 6 and 7, the apparatus 10 is fully assembled and capable of being connected in fluid flowing relation to an object of interest, such as a tank (not shown). So connected, the compression exerted on the respective bolts 90 at the annular grooves 54 and recessed bevels 60 compress o-rings 62 against the faces 58b of the blocks 50A and 50B, thus facilitating a hermetic closure. Similarly, the seals 62 resting on the bolts 90 at the junction of the threads 96 and shafts 102, are compressed at the annular grooves 54 creating a hermetic closure of the seals 62, the recessed bevels 60, annular grooves 54 and bores 56 of the bolts 90. Seals 62 also seal against the tank surface (not shown) to prevent leakage around the threads 96 when the apparatus 10 is mounted to the tank.

Fluid dispensed from and returning to the object of interest, such as a tank (not shown but including an entrance threaded opening matching the threads 96 of the bolts 90), thereby flowing through the bolt 90 by means of the cylinder bore 92, and the blocks 50A and 50B by means of the bore 56 in the blocks 50A and 50B, and cooperating with the bolt holes 108. As shown here, fluid enters the aperture 82 of the nipple 52B, and fills the conduit 14 of the inspection tune 11 to the liquid level of the tank supporting the inspection tube 11.

Referring generally to FIG. 5 and of particular importance, the inspection tube 11 has grooves 22, 24 positioned near the first end 18 and second end 20, respectively. As previously mentioned, each undercut groove 22, 24 of the tube 11 is dimensioned so that the tube seal 30 is seated in the respective groove 22, 24, creating a hermetic closure when the seal 30 is simultaneously fit on the respective nipple 52A, 52B and assembled to the tube 11 to provide the apparatus 10 of the present invention. As opposed to the press fit relationship taught in the prior art, a slip fit exists between the inspection tube 11, seal 30 and nipples 52A, 52B.

As shown here, with further reference to FIGS. 2 and 3, the height 25 of groove 24 is substantially similar to that of seal 30 and the channel height 78 of corresponding nipple 52B. However, groove 22 has a height 23 relatively larger than the seal 30 and the channel height 78 of corresponding nipple 52A. Additionally, the nipple 52A has a length 84A proportionally sized to the height 23 of groove 22. The length 84A of nipple 52A and the height 23 of groove 22 permits movement of block 50A relative to the inspection tube 11 while maintaining a proper seal with tube seal 30, thereby providing axial adjustability within the apparatus 10. The direction of adjustability is shown in FIGS. 8A and 8B, wherein FIG. 8A illustrates the apparatus 10 in a compact position having a distance D1 between the center 91 of bolt 90 and tube end 18. FIG. 8B shows the apparatus 10 in an extended position having a distance D2, larger than distance D1, between the center 91 of bolt 90 and tube end 18.

Providing adjustability not only eases installation of the apparatus but also promotes a better seal. For example, when installing the present invention the entrance threaded openings of the tank (not shown) do not have to be spaced apart to an exact distance. Instead, the distance between the openings may actually be within the adjustability range of the apparatus 10. This not only greatly decreases installation time but also provides a better seal between the blocks 50A, 50B and the tank (not shown). Whereas before, a minor mismeasurement, placing the openings too close together or too far apart, meant that at least one block was not perfectly aligned with the center line of the tube 11, or worse, both blocks were misaligned. Misalignment has been shown to disrupt the ability of seals 30 and 62 to each seal or provide a proper seal. Therefore, adjustability eases installation by permitting an installer to more or less "eye nail" the location of the openings, along with the additional benefit of promoting a better seal throughout as the parts maintain preferred alignment. As stated previously in terms of different embodiments within the purview of the present invention, either tune end 18 or 20, or both, may have a groove of a predetermined height permitting adjustment of the associated block.

Moreover, based upon the slip fit relationship between the first groove 22, the o-ring 30 and the channel 70 of the nipple 52A, and also the relationship between the second groove 24, the o-ring 30 and the channel 70 of the nipple 52B, a hermetic closure is formed with minimal or no mechanical stresses resulting on the inspection tube 11. By greatly decreasing the radial stresses imparted upon the inspection tube 11, the expected life of the tube 11 is thereby increased.

A second important aspect of the invention relates to the formation of the inwardly tapered, recessed bevels 60 and their cooperating coaxial bores 56. As shown in FIG. 7, each of the four recessed bevels has an inner diameter 44 within the concentric bore 56 that is located adjacent the block face 58b or 58f. The inner diameter 44 is less than the recessed bevel outer diameter 46 located at the innermost portion of the concentric bore 56. The recessed bevel 60 retains the outboard seals 62 and thus prevents displacement of the seals 62 during shipping. The same benefit is derived during installation of the fluid level verification apparatus 10. By positively retaining the seal 62 within block 50A, the seal will not become fully or partially dislodged during installation.

Also, of particular importance is the above described interference fit between the seal 62 and an outwardly extending flange, which may be in the form of the innermost bolt thread 96. As best seen in FIG. 7, the major diameter 48 of the bolt threads is greater than the inner diameter 51 of the seal 62. Once assembled, the resulting interference fit prevents the bolt 90 from becoming dislodged from the block 50A, 50B as commonly occurs with prior art devices, particularly during shipping. This apparatus also provides a benefit during installation, as the installer is free to manipulate the apparatus 10 without the bolts 90 falling free from their associated blocks 50A, 50B. Also, the seals or o-rings 62 stay in the recess 60. This feature aids to prevent pinching of the o-ring during installation.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:
1. A fluid level verification apparatus comprising:
   a tubular sight member defining a conduit and having oppositely disposed ends;
   an undercut groove formed within the conduit inwardly spaced from each respective end;

first and second end blocks each having a plurality of faces, said end blocks, respectively, include a bore extending between opposite faces; and a nipple, said nipple being formed on a face adjacent said bore;

an opening being formed in said nipple and being in fluid communication with said bore;

each of said nipples having a circumferential groove exteriorly thereof and being adapted to receive said tube ends;

sealing means being positioned on each of said nipples in said circumferential groove and adapted to receive one of said respective conduit grooves to thereby provide a slip-fit between said nipples and said tube ends;

first and second hollow fastening means adapted to be received within said bores and being in fluid communication with said sight member; and wherein at least one of said conduit grooves has a height larger than the sealing means such that at least one end block is axially telescopically movable relative to the tubular sight member.

2. The fluid level verification apparatus of claim 1, wherein the first and second fastening means each comprise a headed bolt extending through said block bores; and sealing means around each bolt at the opposite sides of the end blocks to seal the blocks against the bolt and tank respectively.

3. The fluid level verification apparatus of claim 2, wherein a recessed bevel is formed on at least one face of each end block, said bevel being inwardly tapered to receive said sealing means.

4. The fluid level verification apparatus of claim 2, wherein a recessed bevel is formed on two opposed faces of each end block, said bevels being inwardly tapered to receive said sealing means.

5. The fluid level verification apparatus of claim 2, wherein said bolts are threaded and an innermost thread of each said bolt comprises an outwardly extending flange to retain said seating means.

6. A fluid level verification apparatus for a tank containing a fluid, the apparatus comprising:

a pair of vertically spaced hollow end members, the respective end members having a cylindrical projection extending therefrom in facing and axially aligned relation, said projections having an axial through bore communicating with the hollow interior of the corresponding end member and circumferential groove exteriorly thereof;

a rigid tubular sight member interposed between said end members and having a cylindrical bore adapted to receive the end member projections in opposed relation and a pair of longitudinally spaced, circumferential grooves formed within said bore;

a seal disposed in the grooves of the respective end member projections and sealingly engaging with the grooves of the tubular member to seal the connection between the tubular member and the respective end members;

hollow fastening means for connecting at least one of said end members to the tank for mounting the apparatus and placing the fluid contents of the tank in communication with the sight member; and wherein, at least one of said pair of longitudinally spaced, circumferential grooves has a height larger than a respective seal such that at least one end member is axially telescopically movable relative to the tubular sight member.

7. A fluid level verification apparatus for a tank containing a fluid, the apparatus comprising:

a pair of vertically spaced end members each having hollow interiors, the respective end members each having a cylindrical projection extending therefrom in facing and axially aligned relation;

each of said projections having an axial through bore communicating with the hollow interior of a corresponding end member and further including a circumferential groove exteriorly thereof;

a tubular sight member interposed between said end members and having a cylindrical bore adapted to receive the end member projections in opposed relation and a pair of longitudinally spaced grooves formed within said bore, each groove being adjacent and end of said member;

an o-ring seal disposed in the grooves of the respective end member projections and sealingly engaging with the tubular member bore grooves to seal the connections between the tubular member and the respective end members;

hollow fastening means connecting at least one of said end members to the tank for mounting the apparatus and placing liquid contents of the tank in communication with the sight member;

said hollow fastening means comprising a headed bolt extending in fore and aft direction through the hollow end member;

sealing means surrounding the bolt at the front and rear of the end member to seal the member against the bolt head and tank respectively; and wherein at least one of said pair of longitudinally spaced grooves has a height larger than a respective o-ring such that at least one end member is axially telescopically movable relative to the tubular sight member.

* * * * *